US007291268B2

(12) United States Patent
Bolman

(10) Patent No.: US 7,291,268 B2
(45) Date of Patent: Nov. 6, 2007

(54) HYDROCYCLONE BUNDLE

(75) Inventor: Steven Bolman, Irvine, CA (US)

(73) Assignee: Siemens Water Technologies Holding Corp., Warrendale, PA (US)

(*) Notice: Subject to any disclaimer, the term of this patent is extended or adjusted under 35 U.S.C. 154(b) by 421 days.

(21) Appl. No.: 10/926,832

(22) Filed: Aug. 26, 2004

(65) Prior Publication Data

US 2005/0230327 A1 Oct. 20, 2005

Related U.S. Application Data

(62) Division of application No. 10/340,525, filed on Jan. 10, 2003, now Pat. No. 6,800,208.

(51) Int. Cl.
*B01D 21/26* (2006.01)
*B01D 17/038* (2006.01)

(52) U.S. Cl. .................. 210/512.2; 209/728; 55/459.1

(58) Field of Classification Search .................. 210/97, 210/143, 512.1, 739, 788; 209/719, 728; 95/271; 55/459.1
See application file for complete search history.

(56) References Cited

U.S. PATENT DOCUMENTS 4,208,270 A 6/1980 Grieve et al.
4,389,307 A 6/1983 Boadway
4,622,150 A 11/1986 Carroll
4,650,584 A 3/1987 Macierewicz
4,673,495 A 6/1987 Carroll et al.
4,698,152 A 10/1987 Carroll
4,711,720 A 12/1987 Young
4,816,165 A 3/1989 Carroll et al.
4,857,197 A 8/1989 Young et al.
4,927,536 A 5/1990 Worrell et al.
4,960,525 A 10/1990 Dalby et al.
4,995,989 A 2/1991 Carroll et al.
5,009,785 A 4/1991 Webb
5,071,556 A 12/1991 Kalnins et al.
5,071,557 A 12/1991 Schubert et al.
5,154,826 A 10/1992 Prendergast et al.
5,194,150 A 3/1993 O'Brien et al.
5,336,410 A 8/1994 O'Brien et al.
5,401,411 A 3/1995 Anderson
5,499,720 A 3/1996 Bouchillon et al.
5,667,686 A 9/1997 Schubert
5,667,687 A 9/1997 Lange
5,858,237 A 1/1999 Hashmi et al.
5,965,021 A 10/1999 Hesse et al.
5,980,639 A 11/1999 Trickey et al.

(Continued)

FOREIGN PATENT DOCUMENTS

WO WO 00/08302 A1 2/2000

OTHER PUBLICATIONS

International Search Report, dated Aug. 4, 2004, PCT/US04/00272,filed Jan. 7, 2004.

(Continued)

*Primary Examiner*—David A Reifsnyder

(57) ABSTRACT

A hydrocyclone bundle comprising a plurality of hydrocyclone liners and a plate assembly for use in liquid-liquid separation is disclosed. The hydrocyclone bundle may be used in new or existing separators. The hydrocyclone liners may be oppositely positioned within the hydrocyclone bundle. The plate assembly may collect and distribute overflow and underflow effluents from the hydrocyclone liners.

16 Claims, 12 Drawing Sheets

U.S. PATENT DOCUMENTS

| | | | |
|---|---|---|---|
| 6,129,217 | A | 10/2000 | Trickey et al. |
| 6,209,641 | B1 | 4/2001 | Stevenson |
| 6,214,220 | B1 | 4/2001 | Favret, Jr. |
| 6,238,579 | B1 | 5/2001 | Paxton et al. |
| 6,312,594 | B1 | 11/2001 | Conrad et al. |
| 6,315,837 | B1 | 11/2001 | Barclay |
| 6,378,608 | B1 | 4/2002 | Nilsen et al. |
| 6,464,884 | B1 | 10/2002 | Gadgil |
| 6,627,081 | B1 | 9/2003 | Hilditch et al. |
| 2001/0002009 | A1 | 5/2001 | Gil et al. |

OTHER PUBLICATIONS

Colman, D.A. and Thew, M.T., "Correlation of Separation Results from Light Dispersion Hydrocyclones," *Chem Eng. Res. Des.*, vol. 61, Jul. 1983, pp. 233-240.

Smyth, I.C. and Thew, M.T., "The Use of Hydrocyclones in the Treatment of Oil Contaminated Water Systems," 1st International Symposium on Oil and Gas Exploration and Production Management Practices, New Orleans, USA, 1990, pp. 1001-1012.

Wolbert, B., MA, B.-F., and Aurelle, Y., "Efficiency Estimation of Liquid—Liquid Hydrocyclones Using Trajectory Analysis," *AIChE Journal*, Jun. 1995, vol. 41, No. 6, pp. 1395-1402.

AXSIA—Total Solutions—Produced Water Treatment Systems—Liquid/Liquid Hydrocyclones, 9 pages from http://www.axsia.com on Jul. 17, 2001.

Baker—Baker Process, 7 pages from http://www.bakerhughes.com on Jul. 17, 2001.

CYCLOTECH—Separation technologies for the petroleum industry, 3 pages from http://www.cyclotech.co,uk Apr. 2004.

U.S. Filter, High Efficiency Liquid/Liquid Hydrocyclone, 1 page from http://www.usfilter.com on Jul. 2001.

HYDROCYCLONE BUNDLE

Related Applications

This application is a divisional application under 35 U.S.C. 120 and claims the benefit of priority to pending U.S. patent application Ser. No. 10/340,525, filed on Jan. 10, 2003, now U.S. Pat. No. 6,800,208 B2, entitled Hydrocyclone Bundle, which is incorporated herein by reference for all purposes.

BACKGROUND

1. Field of Invention

This invention relates generally to a hydrocyclone separator, and, more particularly, to a hydrocyclone bundle used in a hydrocyclone separator and methods of using same.

2. Description of Related Art

Hydrocyclone separators are know in the art for use in the separation of solids from liquid, solids from gas, gas from liquid, and in the separation of liquids from other liquids. In liquid-liquid separation, liquids are separated by density through the use of centrifugal force generated in a non-rotating chamber. Liquid-liquid separation is particularly useful in the oil and gas industries where large volumes of oil and water must be separated.

In liquid-liquid separation, fluid is generally introduced tangentially into an upper portion of a conic hydrocyclone liner at a relatively high velocity. As the fluid flows through a narrowing lower portion of the hydrocyclone liner, the angular velocity of the fluid accelerates in a spiral. As the fluid spirals, centrifugal forces drive the more dense components to the outer portion of the rotating column of the fluid and the less dense components of the fluid migrate to a central column area. The less dense components are passed upwardly through an overflow outlet in the upper portion of the hydrocyclone liner and the more dense components are discharged through an underflow outlet in the lower portion of the hydrocyclone liner.

Cyclone separators are disclose by Carroll et al. disclose, in U.S. Pat. No. 4,673,495. A plurality of cyclone separators are enclosed substantially within a partitioned housing such that a feed inlet of a first cyclone separator is in fluid communication on one side of a partition and a feed inlet of a second cyclone separator is in fluid communication with an underflow outlet of the first cyclone separator on the other side of the partition.

An oil recovery system is disclosed by Carroll in U.S. Pat. No. 4,698,152 wherein water contaminated with oil passes from a first separator bank to an inlet manifold of a second separator bank preferably consisting of one or more cyclone separators which separate the inlet mixture into water and oil components.

A hydrocyclone separation system is disclosed by Worrell et al. in U.S. Pat. No. 4,927,536 wherein a first and second hydrocyclone are oppositely disposed such that a curved flow direction conduit extends from an underflow outlet of a first hydrocyclone separator to a tangential fluid inlet of a second hydrocyclone separator.

A multiple hydrocyclone assembly is disclosed by Bouchillon et al. in U.S. Pat. No. 5,499,720, wherein the hydrocyclone assembly has a closed tubular vertical housing having an outer cylinder. Multiple hydrocyclones are mounted in axially extending rows and in corresponding radial positions from an outer surface of the outer cylinder.

SUMMARY

In one aspect, the present invention is directed to a hydrocyclone bundle comprising a plurality of hydrocyclone liners each having an overflow end and an underflow end, and a first plate fluidly connected to an outlet of one of the overflow end or the underflow end of at least one of the plurality of hydrocyclone liners. The first plate is constructed and arranged to collect fluid from the overflow end or the underflow end of the at least one of the plurality of hydrocyclone liners.

Another aspect of the invention is directed to a hydrocyclone bundle comprising a plurality of hydrocyclone liners, each having an overflow end and an underflow end, a first end plate assembly comprising an overflow plate and an underflow plate, and a second end plate assembly comprising an overflow plate and an underflow plate. The overflow plate of the first end plate assembly is in fluid communication with the overflow plate of the second end plate assembly.

In another aspect of the invention, a hydrocyclone separator comprises a plurality of hydrocyclone bundles and means for interrupting flow from at least one of the hydrocyclone bundles.

Another aspect of the invention is directed to a method of separating a fluid, comprising providing a fluid having a less dense component and a more dense component, feeding the fluid to an inlet of a hydrocyclone bundle thereby separating the less dense component and the more dense component. The less dense component is removed from an overflow outlet of the hydrocyclone bundle, and the more dense component is removed from an underflow outlet of the hydrocyclone bundle.

Another aspect of the invention relates to a method of facilitating separating a fluid having a less dense component and a more dense component, comprising providing a hydrocyclone bundle in a vessel, feeding the fluid to an inlet of the hydrocyclone bundle thereby separating the less dense component and the more dense component. The less dense component is removed from an overflow outlet of the hydrocyclone bundle, and the more dense component is removed from an underflow outlet of the hydrocyclone bundle.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non limiting embodiments of the present invention will be described by way of example with reference to the accompanying drawings, in which.

DETAILED DESCRIPTION

The present invention relates to a bundle of hydrocyclone liners used to separate a less dense component and a more dense component from a fluid. A plurality of hydrocyclone liners are arranged in a bundle which may be used in new or existing vessels or piping systems. The arrangement of hydrocyclone liners and plates may reduce the cost, size, weight, and complexity of hydrocyclone separators, as well as to segregate flow which may increase the operating range of the hydrocyclone separator by expanding its turndown ratio.

Figure 1:
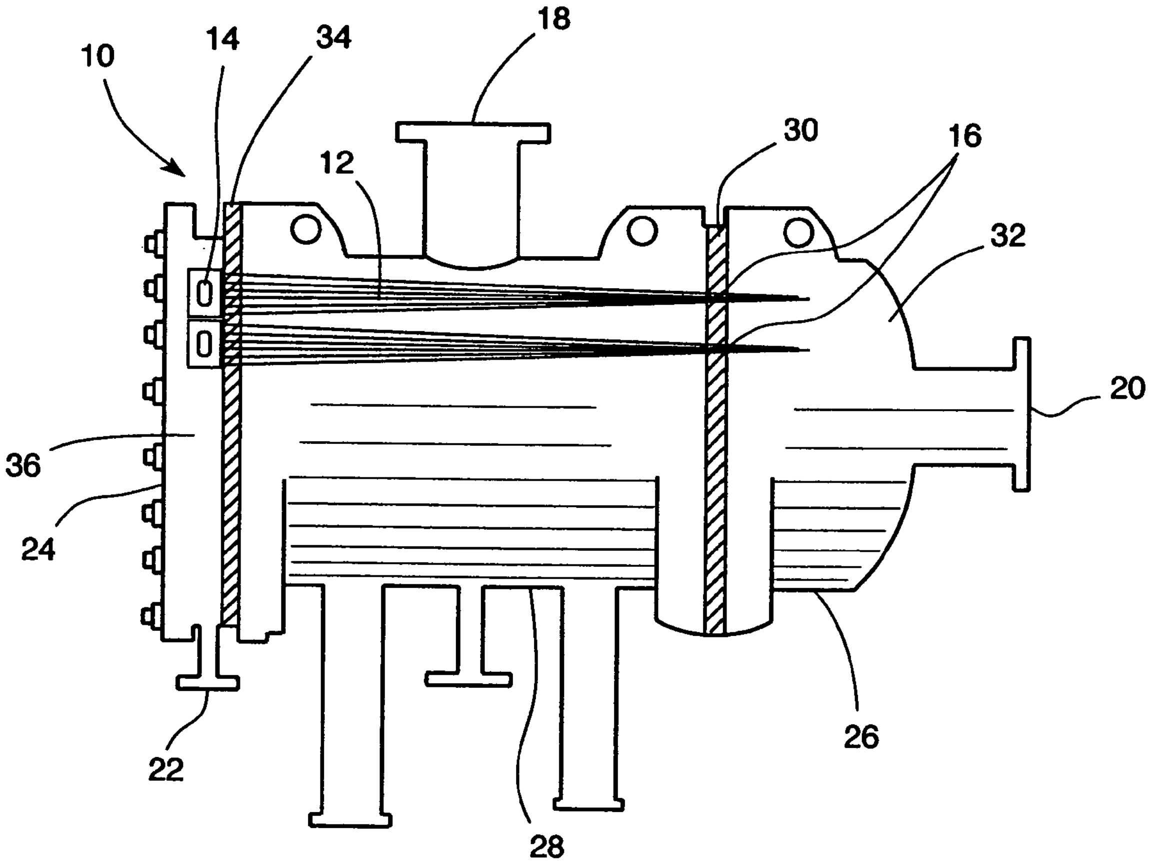
FIG. 1 (Prior Art)
FIG. 1 is a hydrocyclone vessel of the prior art.

FIG. 1 shows a conventional hydrocyclone separator. Hydrocyclone liners 12 are positioned in vessel 10 such that an overflow end 14 of each hydrocyclone liner 12 is located at or near a first end 24 of the vessel 10. Similarly, an underflow end 16 of each hydrocyclone liner 12 is located at or near a second end 26 of vessel 10. Fluid enters inlet flow chamber 28 of vessel 10 through inlet 18, and tangentially enters hydrocyclone liners 12 near an overflow end 14 of the hydrocyclone liner. Overflow plate 34 separates the inlet flow chamber 28 from an overflow collection space 36. Underflow plate 30 separates inlet flow chamber 28 from an underflow collection space 32. As the fluid flows through the hydrocyclone liner 12, the less dense components are passed through an overflow outlet of the hydrocyclone liners and enter the overflow collection space 36, while the more dense components are discharged through an underflow outlet of the hydrocyclone liners and enter the underflow collection space 32. The underflow fluid exits vessel 10 through underflow exit 20, and overflow fluid exits vessel 10 through overflow exit 22. As is know in the art, in order to vary fluid flow through vessel 10, the vessel must be opened so that one or more hydrocyclone liners 12 may be added or removed and replaced with a blank liner (not shown) which provides no flow.

In one embodiment of the invention, a plurality of hydrocyclone liners may be arranged in any manner to provide efficient use of space within a new or existing hydrocyclone separator. The hydrocyclone liners may be arranged in an opposing configuration in such a way that an overflow end of one hydrocyclone liner and an underflow end of another hydrocyclone liner are positioned at one end of a vessel. The hydrocyclone liners may, but need not be, positioned in a single alternating pattern wherein each hydrocyclone liner is oppositely positioned in an alternating arrangement so that the overflow end of each hydrocyclone liner is positioned near the underflow end of an adjacent hydrocyclone liner. In another embodiment, the hydrocyclone liners may be positioned in a multiple alternating pattern, wherein a set of two or more hydrocyclone liners are oppositely positioned near another set of two or more hydrocyclone liners, and the overflow ends of each of the hydrocyclone liners within the set are similarly positioned at one end of a hydrocyclone vessel.

In another embodiment, a plurality of hydrocyclone liners may be grouped together in a hydrocyclone bundle. In one embodiment, a plurality of hydrocyclone liners may be arranged in an opposing configuration in such a way that an overflow end of one hydrocyclone liner and an underflow end of another hydrocyclone liner are positioned at one end of the bundle. In another embodiment, a plurality of hydrocyclone liners are bundled such that the overflow end of each of the liners is positioned at one end of the hydrocyclone bundle. Multiple hydrocyclones may be bundled in any shape or pattern to efficiently utilize available space in a new or existing pipe or vessel. The bundle of hydrocyclone liners may have any overall cross sectional area and comprise any number of hydrocyclone liners useful for a particular purpose. The cross sectional area of the bundle may vary depending on the diameter of the hydrocyclone liners used. The cross sectional area of the bundle may be configured to maximize the number of bundles which may be used in a new or existing hydrocyclone separator. The cross sectional areas of the bundles may be configured to be close packed.

The hydrocyclone bundle may, but need not, comprise an even number of hydrocyclones for close packing. The hydrocyclone liners may be similarly positioned within the bundle so that the over flow ends of each hydrocyclone liner are positioned at one end of the hydrocyclone bundle. Alternatively, the hydrocyclone liners within the bundle may be arranged in a variety of opposing configurations. As used herein, the phrase “opposing configuration” is used to define a configuration of hydrocyclone liners in which an overflow end of at least one hydrocyclone liner and the underflow end of at least another hydrocyclone liner are positioned at one end of a hydrocyclone separator. A variety of configurations may be imagined, such as the single alternating pattern or multiple alternating pattern mentioned above. In a preferred embodiment, a plurality of hydrocyclone liners are oppositely positioned in a bundle to increase the number of hydrocyclone liners per a given area.

Any hydrocyclone liner may be bundled in an opposite configuration to increase the number of hydrocyclone liners per a given area. The hydrocyclone liner may have a continuous or jointed taper between a wide overflow end and a narrow underflow end. In one embodiment a hydrocyclone liner having a separating section with a cross sectional area that gradually and continuously decreases toward the underflow end may be used. One example of a liner is disclosed by Schubert in U.S. Pat. No. 5,667,686, incorporated herein by referenced for all purposes.

The hydrocyclone bundle may comprise a plate or plate assembly positioned at one or both ends of the bundled hydrocyclones. The plate may be constructed and arranged to hold each hydrocyclone liner in place. The plate may also be constructed and arranged to collect effluent from the overflow end and/or underflow end of the hydrocyclone liners. The plate may have any cross sectional area useful for a particular purpose, and may correspond to the cross sectional area of the bundled hydrocyclones. Multiple plates may form a plate assembly constructed and arranged to support each hydrocyclone liner as well as to collect and distribute overflow and underflow effluents from the hydrocyclone liners.

One or more hydrocyclone bundles may be positioned in a variety of separators, such as in piping, a new vessel, and/or a retrofitted vessel. In one embodiment, two or more bundles may be packed one after another in series, such that effluent of one bundle may be directed to an inlet of another bundle. In another embodiment, the two or more bundles may be packed in parallel and fluidly connected in series such that the effluent of one bundle may be directed to an inlet of another bundle. In a preferred embodiment, the bundles may be close packed in parallel so that a fluid to be separated into a less dense component and a more dense component may be simultaneously directed to all bundles. Each bundle in a multiple bundle separator may, but need not, be identical in number, size and position of liners within each bundle.

One or more hydrocyclone liner bundles may be individually fluidly connected to an outlet of the hydrocyclone separator, such that fluid flow may be interrupted at one or any number of the hydrocyclone bundles. For example, the hydrocyclone separator may include a valve fluidly connected to a pair of valves corresponding to the overflow and underflow outlets from a single hydrocyclone bundle or a set of hydrocyclone bundles to be interrupted. Alternatively, all or any number of hydrocyclone bundles may be valved so that flow to a specific hydrocyclone bundle may be interrupted. Because the number of hydrocyclone liners per bundle may be varied, the number and size of bundles used in a separator may be varied, and flow to the bundles may be interrupted individually or as a set, a separator having an almost unlimited turn down ratio may be designed, so that one separator may handle a wide range of fluid flow.

For example, a separator having nine hydrocyclone bundles may have a first pair of valves (pair A) capable of interrupting flow to one hydrocyclone bundle, a second pair of valves (pair B) capable of interrupting flow to two hydrocyclone bundles, a third and fourth pair of valves (pair C and D, respectively) capable of interrupting flow to three hydrocyclone bundles each. As inlet flow increases for the hydrocyclone separator, valve pair A may be opened with all other valves closed, providing one ninth of the total flow capacity of the hydrocyclone separator. As inlet flow increases for the hydrocyclone separator, valve pair A may be closed and valve pair B may be opened with all other valves closed providing two ninths of the total flow capacity of the hydrocyclone separator. As inlet flow increases still further for the hydrocyclone separator, valve pair B may be closed and valve pair C (or D) may be opened with all other valves closed providing one third of the total flow capacity of the hydrocyclone separator. As inlet flow continues to increase for the hydrocyclone separator, valve pair A may be opened and valve pair C (or D) may remain open with all other valves closed providing four ninths of the total flow capacity of the hydrocyclone separator. In response to further increases in flow for the hydrocyclone separator, valve pair A may be closed, valve pair B may be opened and valve pair C (or D) may remain open with all other valves closed providing five ninths of the total flow capacity of the hydrocyclone separator. In response to further increases in flow for the hydrocyclone separator, valve pair A may be opened and valve pair B and valve pair C (or D) may remain open with all other valves closed providing two thirds of the total flow capacity of the hydrocyclone separator. In response to still further increases in flow for the hydrocyclone, all valves except valve pair B may be opened providing seven ninths of the total flow capacity of the hydrocyclone separator. In response to still further increases in flow for the hydrocyclone all valves except valve pair A may be opened providing eight ninths of the total flow capacity of the hydrocyclone separator. Lastly, with all valves opened 100% of the hydrocyclone separator capacity may be provided. This combination of flow control valves maintains the flow rate through, and associated pressure drop across each hydrocyclone bundle and or liner.

One or more valves may be manually or automatically controlled. In one embodiment, as an example, the valves may automatically respond to a signal originating from a sensor which may detect pressure, flow rate, or another characteristic. The signal may be any suitable signal, such as, a pneumatic signal, a mechanical signal, an electrical signal, or the like. The sensor may be located in any appropriate position for a particular purpose, such as, upstream of the separator. The valve(s) may be a check valve, a gate valve, a diaphragm valve, a globe valve, a butterfly valve, or the like. In response to the signal, the valve may respond by fully opening and closing in some embodiments, or by partially opening and closing in other embodiments. Other methods for regulating the flow to the bundles may also be envisioned.

Figure 2:
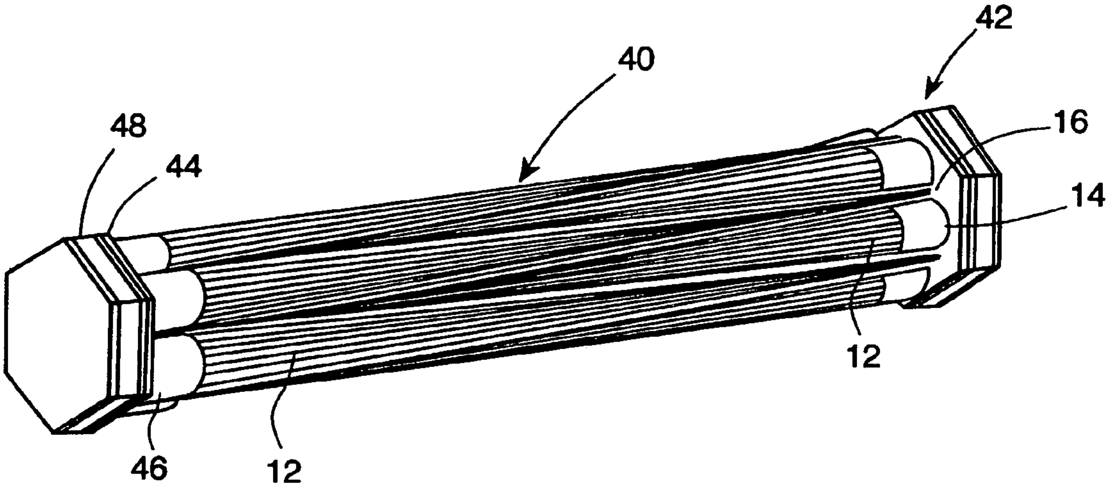
FIG. 2 is a hydrocyclone bundle having a plurality of hydrocyclone liners.

FIG. 2 shows one embodiment of a hydrocyclone bundle 40 comprising hydrocyclone liners 12 positioned longitudinally in a substantially circular pattern. Although this embodiment is configured to accommodate 12 hydrocyclone liners, as mentioned above, any number of hydrocyclone liners may be used for a particular purpose. In this embodiment, adjacent hydrocyclone liners 12 are oppositely positioned in an alternating arrangement, such that an overflow end 14 of one hydrocyclone liner 12 is positioned near an underflow end 16 of an adjacent hydrocyclone liner 12. Because hydrocyclone liners typically have a wide overflow end 14 and taper to a narrow underflow end 16, the opposing positions of the hydrocyclone liners 12 allow more hydrocyclone liners 12 to be positioned in an area than would be capable if all hydrocyclone liners 12 were uniformly positioned in an identical area with each overflow end 14 located at one end of the vessel 10. In this embodiment, a plurality of overflow ends 14, each having an overflow exit, and a plurality of underflow ends 16, each having an underflow exit, are located at each end of the hydrocyclone bundle. Plate assembly 42 collects and separates the overflow and underflow effluents.

Figure 3:
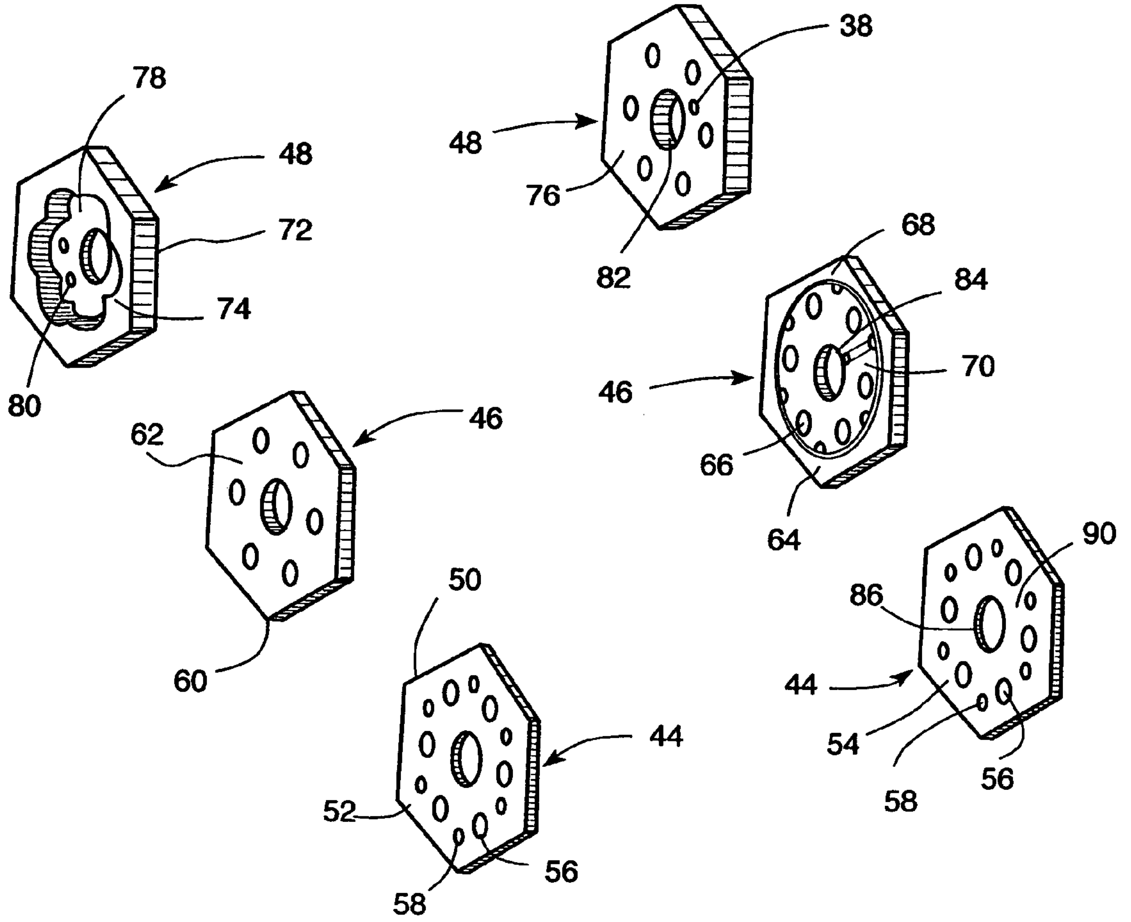
FIG. 3 is an exploded view of a partial plate assembly.
Figure 17:
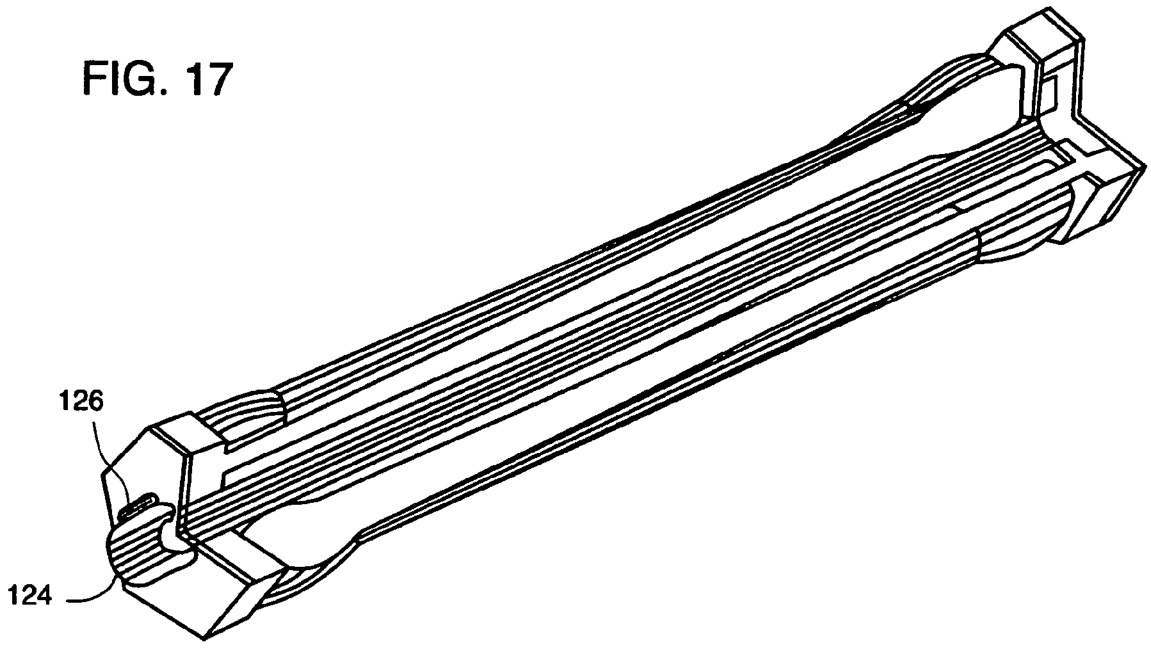
FIG. 17 is a cut away view of a hydrocyclone liner bundle having an overflow effluent and an underflow effluent positioned at one end.

As shown in FIG. 3, in one embodiment, plate assembly 42 may comprise a plurality of plates 44, 46, and 48 positioned at each end of the hydrocyclone bundle 40. The plates may be constructed and arranged to collect and direct overflow and/or underflow effluents. Overflow and underflow effluents may exit hydrocyclone bundle 40 at the same or opposite ends of hydrocyclone bundle 40. FIG. 17 shows an embodiment of a hydrocyclone bundle having an overflow exit 126 and underflow exit 124. The plurality of plates may be flush mounted together, welded, bolted or otherwise compressed with or without a gasket material to prevent leakage of one process stream into another. The plates may, but need not, be attached to a separator vessel. The plurality of plates when assembled in any fashion described herein, or evident to one skilled in the art, may maintain a pressure differential over their outer surfaces and their inner void surfaces. Conventional overflow plate 34 and underflow plate 30 shown in FIG. 1 are typically metal plates designed to resist the forces generated by the pressure differential acting on the area of the plates. Because hydrocyclone separators utilize pressure differential to affect separation, the pressures present in the inlet area 28 of the hydrocyclone separator can be several hundred pounds per square inch greater than the pressures present in the overflow collection volume 36 and underflow collection volume 32. By replacing the overflow plate 34 and underflow plate 30 with a plurality of, smaller plate assemblies which are themselves not required to maintain a pressure differential, the cost and weight of the plates required to maintain a given pressure drop may significantly be reduced. By exposing all outer surfaces of the plate assembly to the same inlet pressure, the forces acting on the plate assembly may be balanced. The forces acting on the individual plates as they retain the differential pressures found in the higher pressure inlet volume and the lower pressure overflow and underflow collection volumes are compressive in nature and may place less mechanical loading on the plates. This compressive load may require much less mechanical strength than the shear forces encountered by the typically much larger conventional flat plate required to resist several hundred pounds of pressure distributed across the plate's area while displaying only negligible deflection across the plate's diameter.

Referring again to FIG. 3, backing plate 44 comprises a body 50 having a first surface 52, a second surface 54, and a plurality of passageways extending through the body 50 from the first surface 52 to the second surface 54. Underflow passageway 56 may be constructed and arranged to receive the underflow end 16 of hydrocyclone liner 12. As used herein, the term "receive" is defined as to bear the weight or force of an element being received. The receipt of an element by a passageway extending through a body may, but need not, provide a fluid tight seal to prevent the passage of fluids which may be present at either or both surfaces of the body. In another embodiment, passageway 56 may be fluidly connected to the underflow exit of hydrocyclone liner 12. Overflow passageway 58 may be constructed and arranged to receive an overflow exit of hydrocyclone liner 12. In another embodiment, passageway 58 may be fluidly connected to the overflow exit of hydrocyclone liner 12. Passageway 90 may be constructed and arranged to receive an overflow conduit (not shown). In another embodiment, passageway 90 may be fluidly connected to passageway 70 of overflow plate 46.

Overflow plate 46 comprises a body 60 having a first surface 62, a second surface 64, and a plurality of underflow passageways 66 extending though the body 60 from the first surface 62 to the second surface 64. Underflow passageway 66 may be constructed and arranged to receive the underflow end 16 of hydrocyclone liner 12. In another embodiment, underflow passageway 66 may be fluidly connected to underflow passageway 56 of backing plate 44. Overflow plate 46 may also comprise a recess 68 in the second surface 64 constructed and arranged to collect overflow effluent from the overflow end 14 of hydrocyclone liner 12. Recess 68 may also be constructed and arranged to receive an overflow exit of hydrocyclone liner 12. Recess 68 may have any shape and depth suitable for a particular purpose. Overflow plate 46 may, but need not, comprise passageway 70 extending from recess 68 through body 60 to the first surface 62. Passageway 70 may be constructed and arranged to receive an overflow conduit (not shown). In another embodiment, passageway 70 may be fluidly connected to passageway 90 of backing plate 44, and/or fluidly connected to passageway 38 of underflow plate 48.

Figure 4:
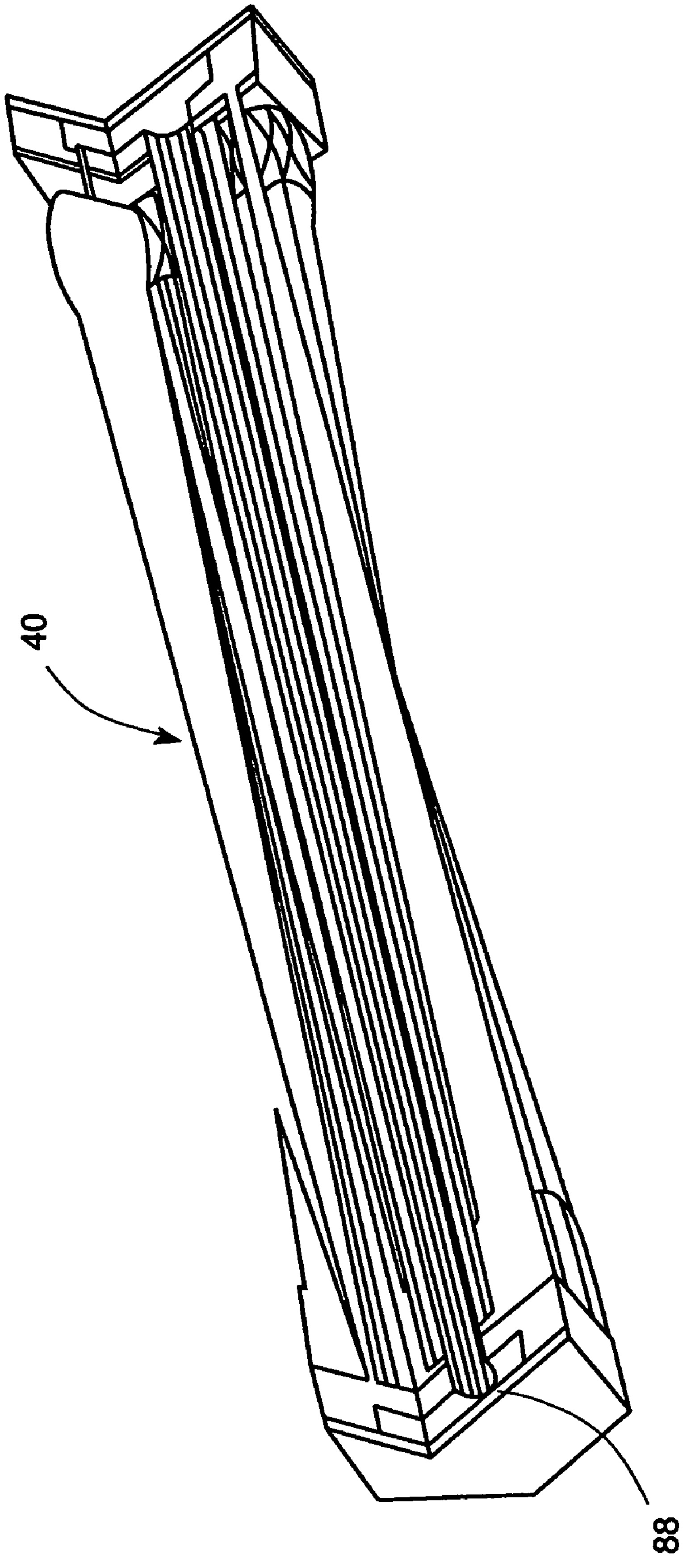
FIG. 4 is a cut away view of the hydrocyclone bundle of FIG. 2.

Underflow plate 48 comprises a body 72 having a first surface 76, a second surface 74 having a recess 78. Recess 78 may be constructed and arranged to collect underflow effluent from the underflow end 16 of hydrocyclone 12. Recess 78 may also be constructed and arranged to receive the underflow end 16 of hydrocyclone liner 12. Recess 78 may have any shape and depth suitable for a particular purpose. Underflow passageway 80 extends through the body 72 from the recess 78 in the second surface 74 to the first surface. Passageway 80 may be constructed and arranged to receive the underflow end 16 of hydrocyclone liner 12. Alternatively, passageway 80 may be fluidly connected to the underflow exit of hydrocyclone liner 12. Underflow plate 48 may, but need not, have passageway 38, constructed and arranged to receive underflow conduit 88, as shown in FIG. 4. In another embodiment, passageway 38 may be fluidly connected to underflow passageways 66 of overflow plate 46.

FIG. 4 shows a cut away section of the bundle of FIG. 2 illustrating underflow conduit 88 extending between each plate assembly. Underflow conduit 88 may be constructed and arranged to be received by passageways 82, 84 and 86 of plates 48, 46, and 44, respectively. In another embodiment, an inlet or outlet of underflow conduit 86 may be in fluid communication with passageways 82, 84, and 86. Underflow conduit 88 is in fluid communication with recess 78 of plate 48 allowing the underflow effluent to flow from the underflow end 16 of hydrocyclone liners 12 to the underflow end 16 of oppositely positioned hydrocyclone liners 12.

The hydrocyclone bundle 40 may also comprise an overflow conduit (not shown) extending between each plate assembly. The overflow conduit may be constructed and arranged to be received by passageway 38 of underflow plate 48, passageway 70 of overflow plate 46, and/or passageway 90 of backing plate 44. In another embodiment, the overflow conduit may be in fluid communication with passageways 38, 70, and/or 90.

Figure 5A:
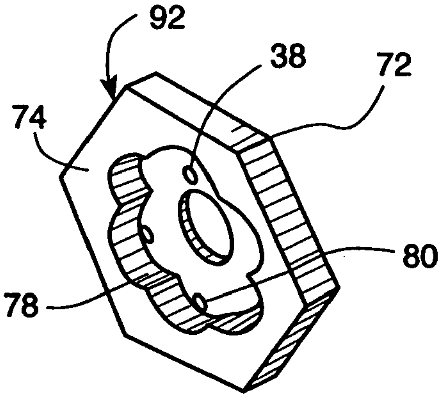
FIG. 5*a* is a perspective view of a first side of an underflow plate positioned near an overflow exit of a hydrocyclone bundle.
Figure 5B:
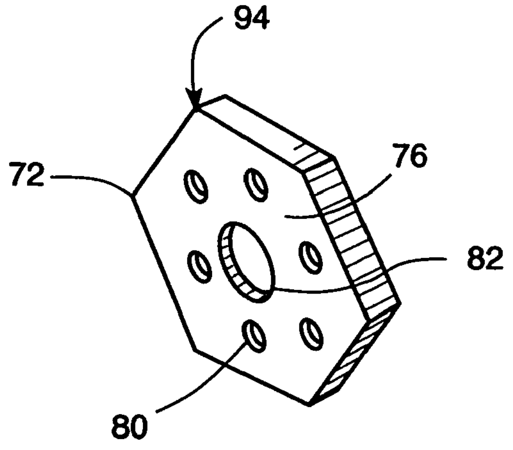
FIG. 5*b* is a perspective view of a second side of an underflow plate positioned near an end of a hydrocyclone bundle opposite to the overflow exit of the hydrocyclone bundle.
Figure 6A:
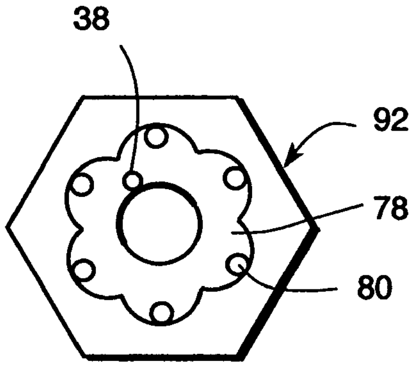
FIG. 6*a* is a top view of the underflow plate of FIG. 5*a*.
Figure 6B:
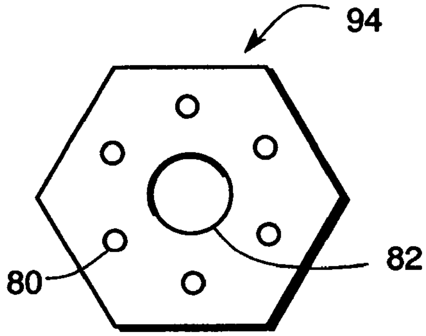
FIG. 6*b* is a top view of the underflow plate of FIG. 5*b*.

Two embodiments of an underflow plate are shown in FIGS. 5*a*, 5*b*, 6*a* and 6*b*. FIGS. 5*a* and 6*a* show an underflow plate 92 which may be positioned near an overflow outlet of the hydrocyclone bundle. FIG. 5*b* represents an underflow plate 94 which may be positioned near an opposite end of the hydrocyclone bundle. Underflow plate 94 comprises a recess in a first surface (not shown) which collects underflow effluent of the hydrocyclone liners when the surface is sealingly positioned adjacent solid endplate 96. As used herein, the phrase "sealingly positioned adjacent" is defined as contact which provides a fluid tight seal between and among corresponding passageways. A fluid tight seal may include a gasket positioned between adjacent plates, sealing groves on a surface of one or both plates to accept a gasket, or a boss portion on one or both plates. A void resulting from a seal between endplate 96 of FIG. 11 and underflow plate 94 allows the underflow effluent to be collected and directed through passageway 82 and conduit 88 to the opposite end of the hydrocyclone bundle. The underflow effluent then passes through passageway 82 of underflow plate 92 of FIGS. 5*a* and 6*a* mixing with underflow effluent entering recess 78 of underflow plate 92 from the underflow end of the hydrocyclone liners positioned in passageways 80, or directly from passageways 80 which are fluidly connected to the underflow end of the hydrocyclone liners. The first surface 74 of underflow plate 92 is sealingly positioned adjacent endplate 98 of FIG. 10 forming a collection void. Underflow effluent passes through underflow passageway 108 of endplate 98 exiting the hydrocyclone bundle. Underflow plate 92 comprises passageway 38 that accommodates an overflow conduit allowing the overflow effluent collected at the opposite end of the hydrocyclone bundle to pass through underflow plate 92.

Figure 7A:
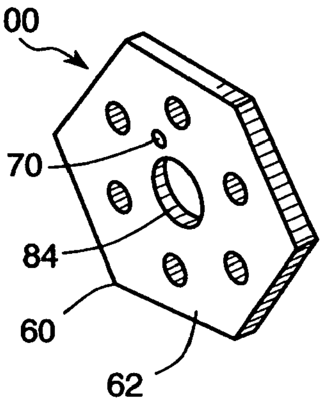
FIG. 7*a* is a perspective view of a first side of an overflow plate positioned near an overflow exit of a hydrocyclone bundle.
Figure 7B:
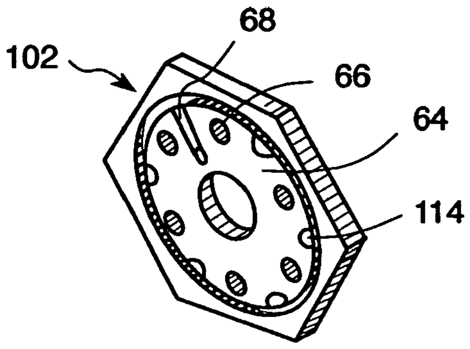
FIG. 7*b* is a perspective view of a second side of an overflow plate positioned near an end of a hydrocyclone bundle opposite to the overflow exit of the hydrocyclone bundle.
Figure 8A:
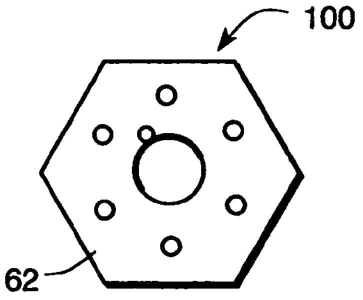
FIG. 8*a* is a top view of the overflow plate of FIG. 7*a*.
Figure 8B:
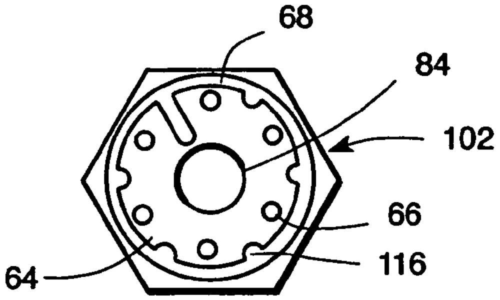
FIG. 8*b* is a top view of the overflow plate of FIG. 7*b*.

Two embodiments of an overflow plate are illustrated in FIGS. 7*a*, 7*b*, 8*a*, and 8*b*. FIGS. 7*a* and 8*a* illustrate a first side of an overflow plate 100 positioned near an overflow exit of a hydrocyclone bundle. FIGS. 7*b* and 8*b* illustrate a second side of an overflow plate 102 positioned at an opposite side of the hydrocyclone bundle. Overflow plate 102 comprises a recess 68 in a second surface 64 which collects overflow effluent from the overflow end of the hydrocyclone liners when the second surface 64 is sealingly positioned adjacent a backing plate 104. A void resulting from a seal between backing plate 104 and the overflow plate 102 allows the overflow effluent to be collected and directed through the overflow conduit fluidly connected to the recess 68 by passageway 90 of the backing plate 104. Overflow effluent passes through overflow conduit, to the opposite end of the hydrocyclone bundle, through passageway 90 of a second backing plate 104 which is sealingly positioned adjacent a second surface of overflow plate 100 of FIGS. 7*a* and 7*b*. A recess in the second surface of overflow plate 100 (not shown) provides a collection void when sealingly positioned adjacent to the second backing plate 104. Overflow effluent from the overflow conduit, as well as from the overflow ends of hydrocyclone liners fluidly connected to the recess 68 and passageway 70 in overflow plate 100 are collected and passed through passageway 38 of underflow plate 92 to an exit of the hydrocyclone liner bundle.

Figure 9A:
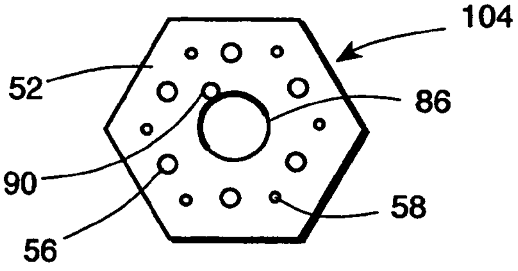
FIG. 9*a* is a top view of a first side of a backing plate.
Figure 9B:
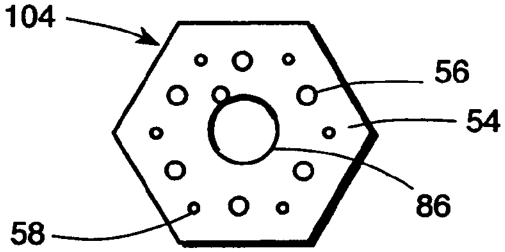
FIG. 9*b* is a top view of a second side of the backing plate of FIG. 9*a*.

An embodiment of a backing plate 104 is shown in FIGS. 9*a* and 9*b* depicting a first and second side, respectively. As previously mentioned, when baking plate 104 is sealingly positioned adjacent overflow plate 100 or 102, an overflow collection void is formed to collect overflow effluent for further distribution. Overflow effluent enters the void through an overflow exit of the hydrocyclone liner positioned in passageway 58. Passageway 90 of backing plates 104 positioned at opposing ends of the hydrocyclone bundle receive an overflow conduit allowing overflow effluent from a first overflow collection void to flow to a second overflow collection void at the opposing end of the hydrocyclone bundle. Passageway 86 of backing plates 104 positioned at opposing ends of the hydrocyclone bundle receive an underflow conduit for passing underflow effluent from a first underflow collection void located at one end of the hydrocyclone bundle to a second underflow collection void located at an opposing end of the hydrocyclone bundle.

Figure 10:
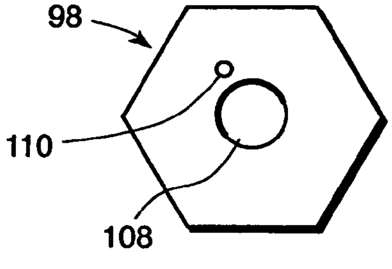
FIG. 10 is a top view of an endplate.
Figure 11:
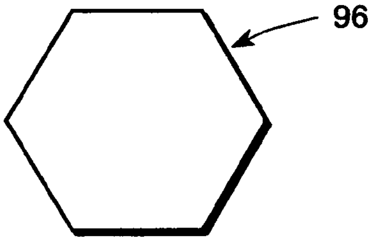
FIG. 11 is a top view of another endplate.

Additional plates 98 and 96 shown respectively in FIGS. 10 and 11 may be included in a plate assembly. End plate 96 comprises a solid surface that when sealingly positioned adjacent a first surface 74 of underflow plate 106 forms an overflow collection void, collecting underflow effluent from the underflow end of one set of hydrocyclone liners. The underflow effluent passes through the underflow conduit to an underflow collection void formed when the first surface of underflow plate 92 is sealingly positioned adjacent end plate 108 at the other end of the hydrocyclone bundle. End plate 108 comprises passageways 108 and 110 each constructed and arranged to receive an underflow exit and an overflow exit of the hydrocyclone bundle.

Figure 12A:
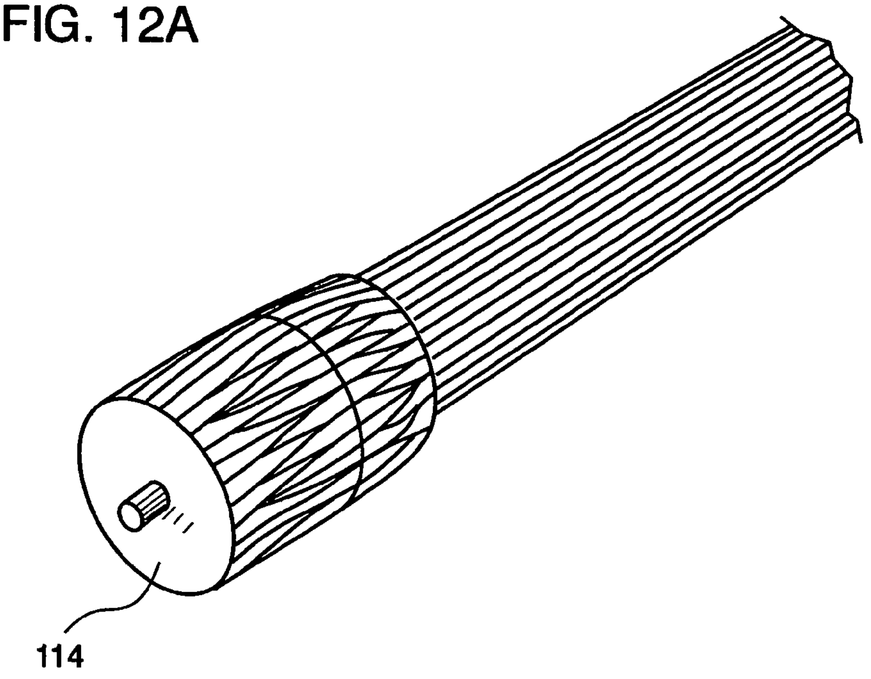
FIG. 12*a* is a perspective view of an overflow end of a hydrocyclone liner.
Figure 12B:
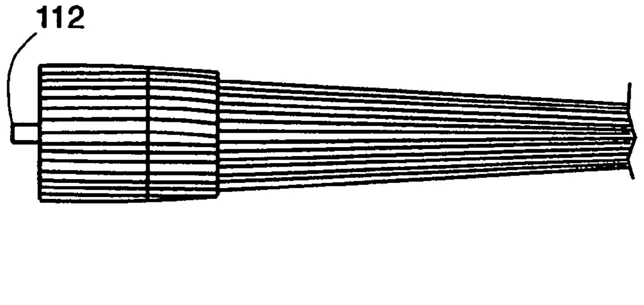
FIG. 12*b* is a side view of the overflow end of the hydrocyclone liner of FIG. 12*a*.
Figure 12C:
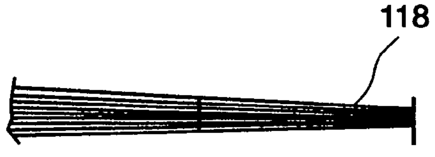
FIG. 12*c* is a side view of an underflow end of the hydrocyclone liner of FIG. 12*a*.
Figure 13:
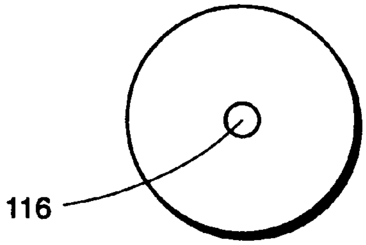
FIG. 13 is an end view of an overflow end of the hydrocyclone liner of FIG. 12*a*.

FIGS. 12*a* and 12*b* show one embodiment of a hydrocyclone liner having a nipple 112 located at the overflow end 114 of the hydrocyclone liner that may be used with a plate assembly. Nipple 112 may be inserted through overflow passageway 58 of backing plate 104 and into recess 68 of overflow plates 100 or 102. The recess 68, may be constructed and arranged to receive nipple 112. For example, recess 68 may comprise groove 116 to support the nipple 112 of the hydrocyclone liner, and allow overflow effluent to be collected in the recess. FIG. 13 shows a side view of the hydrocyclone liner having nipple 112 and overflow exit 116. Nipple 112 may be fluidly sealed to backing plate 104. For example, nipple 112 may comprise an o-ring and or a groove that sealingly contacts an inner wall of passageway 58. In another embodiment, overflow end may comprise an o-ring gland and/or a groove that sealingly contacts one of the surfaces of backing plate 104. FIG. 12*c* shows an underflow end of a hydrocyclone liner having an outer surface 118. The underflow end may be inserted into one or more plates, and may be constructed and arranged to provide a fluid tight seal with one or more plates. In one embodiment, the underflow end may comprise a groove (not shown) on outer surface 118. The groove may receive a seal, such as a gasket or o-ring. The groove may be constructed and arranged to receive a corresponding boss on the inner surface of any of passageways 56, 66, and 80 of plates 44, 46, and 48 respectively. The outer surface of the underflow end may be threaded to mate with corresponding threads in passageways 55, 66, and/or 80.

Figure 14:
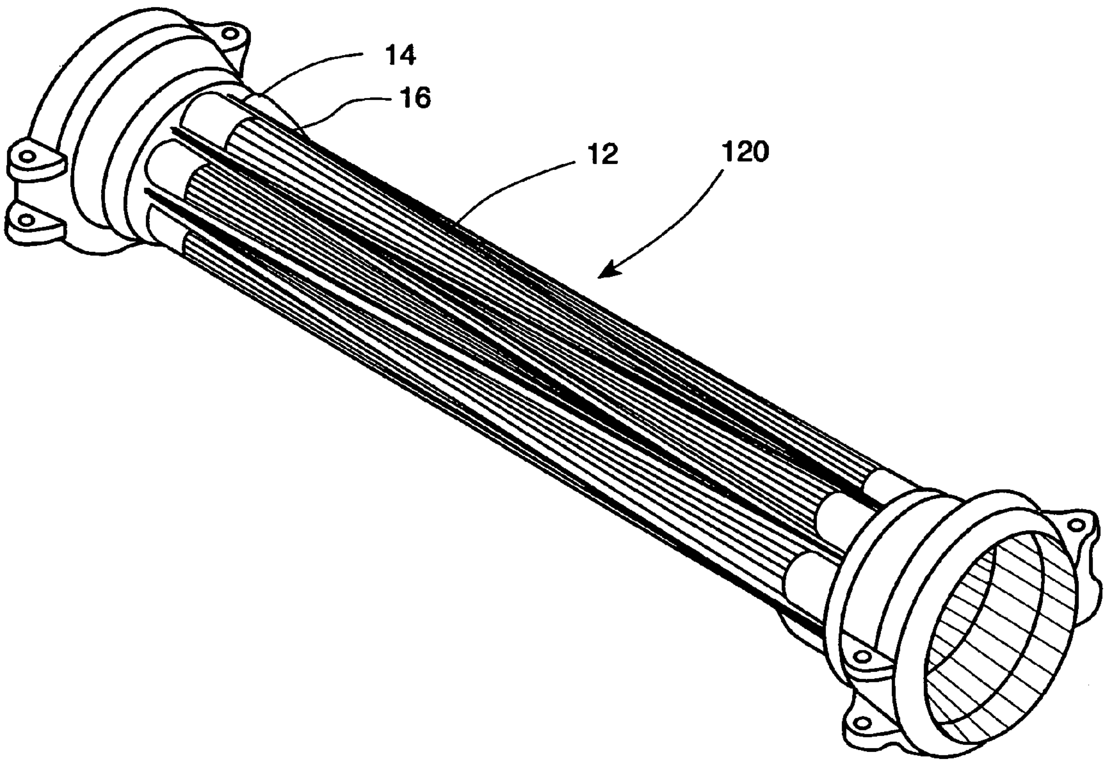
FIG. 14 is a perspective view of a hydrocyclone bundle having 16 hydrocyclone liners.
Figure 15:
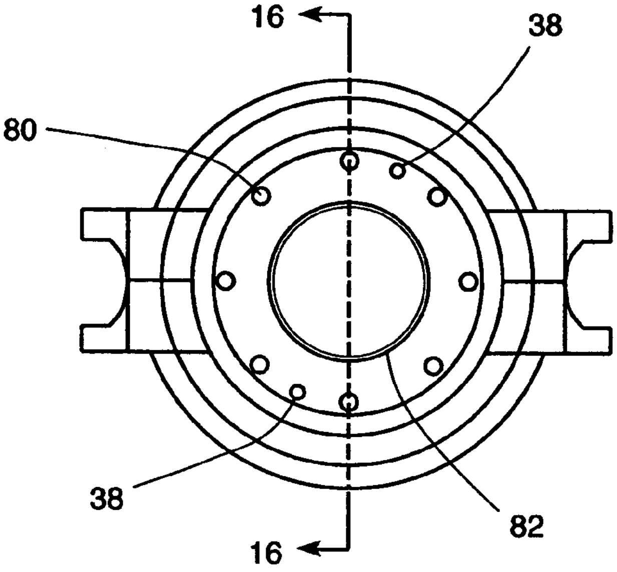
FIG. 15 is an end view of the hydrocyclone bundle of FIG. 14, showing another embodiment of an underflow plate.
Figure 16:
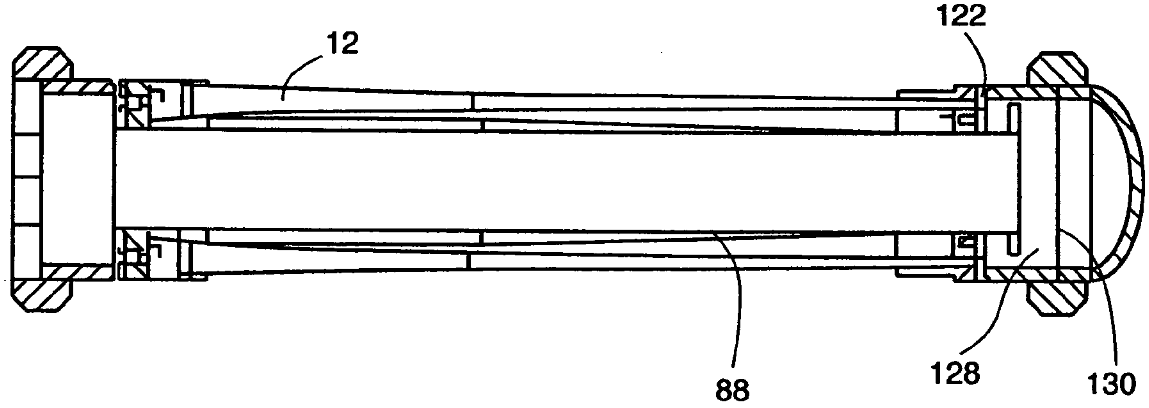
FIG. 16 is a cross sectional view of the hydrocyclone bundle taken along section line 16-16 of FIG. 15 with an endcap.
Figure 19A:
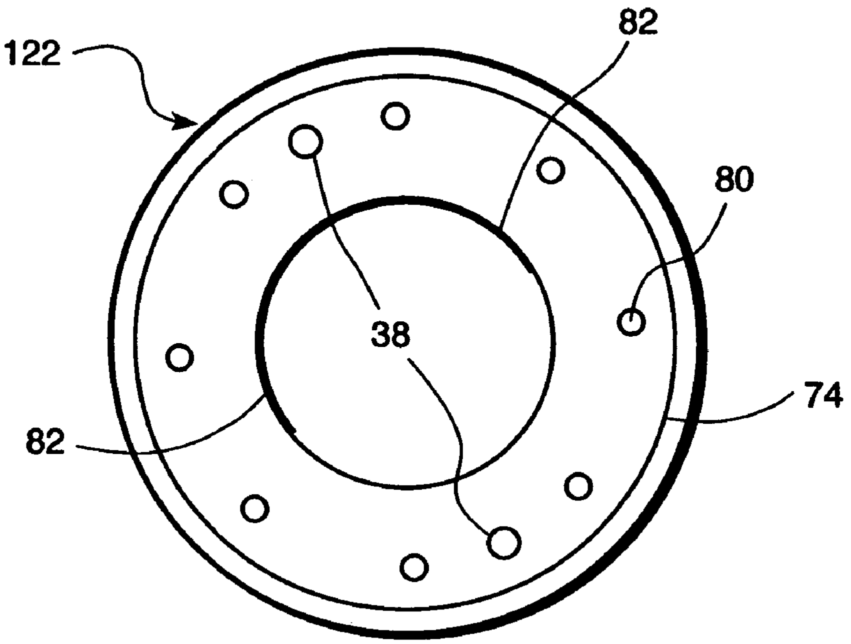
FIG. 19*a* is an end view of a first side of an underflow plate shown in FIG. 15.
Figure 19B:
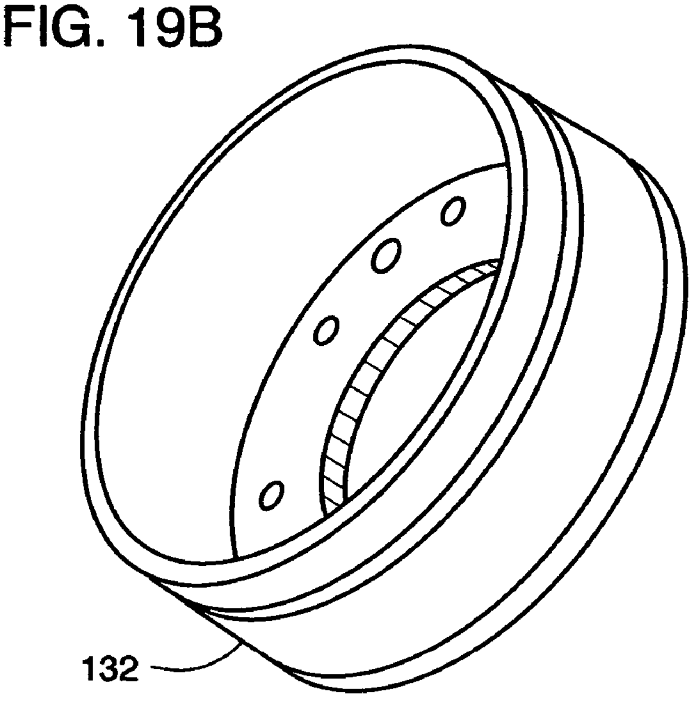
FIG. 19*b* is a perspective view of the first side of the underflow plate of FIG. 19*a*.
Figure 19C:
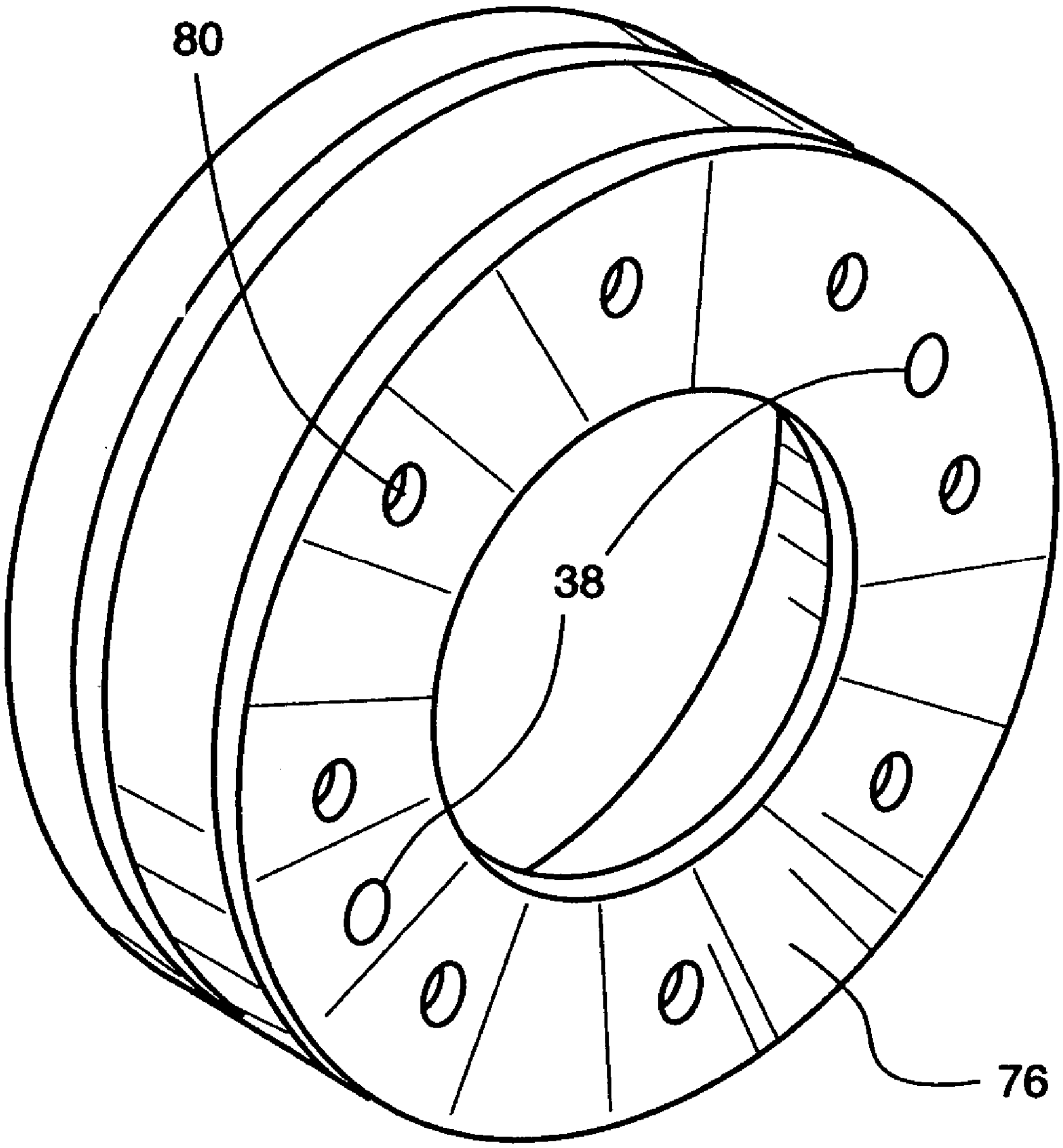
FIG. 19*c* is a perspective view of a second side of the underflow plate of FIG. 19*a*.

FIG. 14 is a perspective view of another hydrocyclone bundle having a plurality of hydrocyclone liners 12. Although this embodiment accommodates 16 hydrocyclone liners, as noted above, any number of liners may be used. In this embodiment, each of the sixteen hydrocyclone liners is oppositely positioned in an alternating pattern, such that the overflow end of each hydrocyclone liner is positioned adjacent the underflow end of an adjacent hydrocyclone liner. In FIG. 15, one embodiment of an underflow plate 122 is constructed and arranged to receive the underflow ends of eight hydrocyclone liners. Passageways 80 receive the underflow end of the individual hydrocyclone liners. As seen in FIGS. 19A, 19B and 19C, underflow plate 122 has a first surface 74 having a protruded periphery portion 132 extending outward from the first surface defining a collection recess. The protruded periphery portion is constructed and arranged to provide a collection space for underflow effluent. In one embodiment illustrated in FIGS. 19A, 19B and 19C, the protruded periphery portion 132 is positioned adjacent an outer perimeter of underflow plate 122 to collect effluent from conduit 88, illustrated in FIG. 16, via passageway 82 and from the underflow end of individual hydrocyclone liners positioned in passageways 80. In another embodiment, the protruded periphery portion may be positioned adjacent passageway 82 so that effluent from the underflow and the individual hydrocyclone liners positioned in passageways 80, may be collected and passed to conduit 88. In another embodiment, conduit 88 may extend through passageway 80 and may further define a collection space. Underflow effluent exits the underflow end of the hydrocyclone liners and enters underflow collection space 128, illustrated in FIG. 16, formed between endcap 130, first surface 74, and protruded periphery portion 132. Underflow effluent may then pass through conduit 88 to the opposing side of the bundle for collection with the underflow effluent from the remaining 8 hydrocyclone liners. Underflow plate 122 may comprise overflow passageways 38 to pass overflow effluent to an opposing side of the hydrocyclone bundle or out of the hydrocyclone bundle. Underflow plate 122 may be used in conjunction with an overflow plate and/or a backing plate. In another embodiment, underflow plate 122 may comprise an overflow recess in an opposing surface such that overflow effluent from 8 of the hydrocyclone liners is redirected to the opposing side of the hydrocyclone bundle while underflow effluent passes into underflow collection space 128.

Figure 18A:
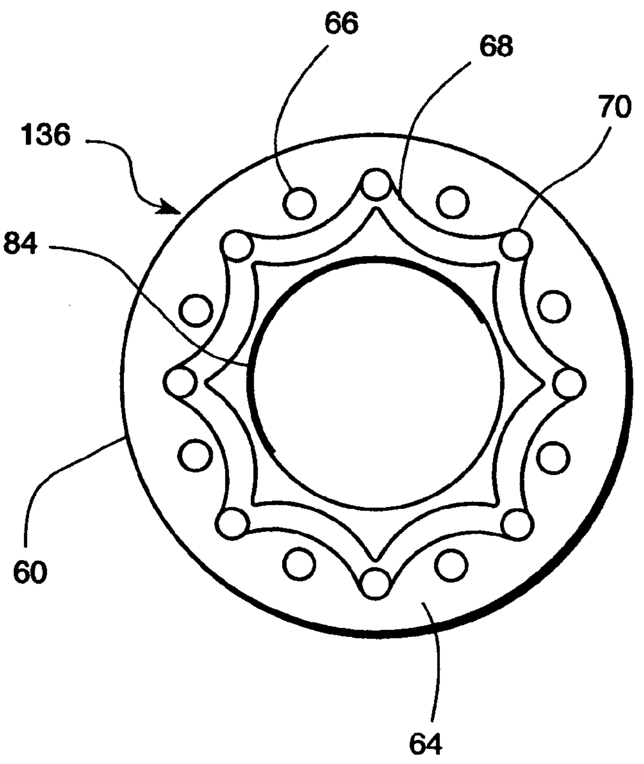
FIG. 18*a* is an end view of a first side of an overflow plate of another embodiment.
Figure 18B:
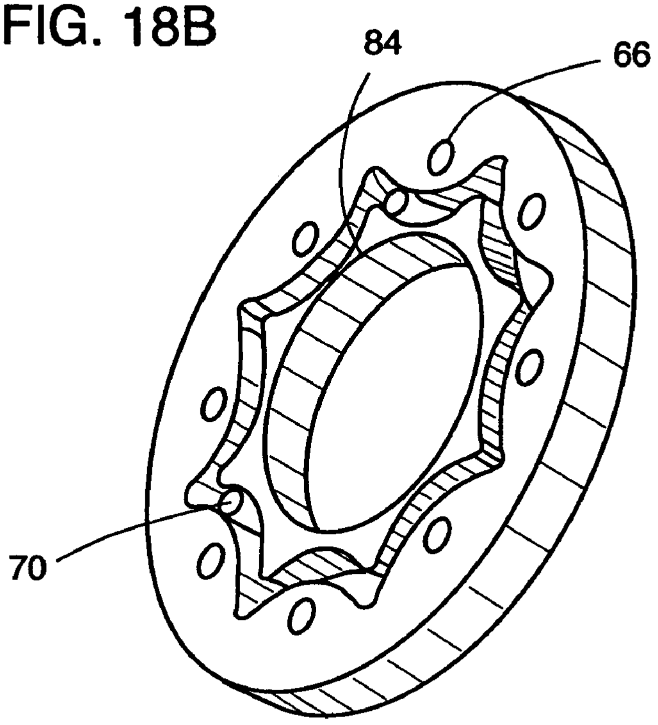
FIG. 18*b* is a perspective view of the overflow plate of FIG. 18*a*.
Figure 18C:
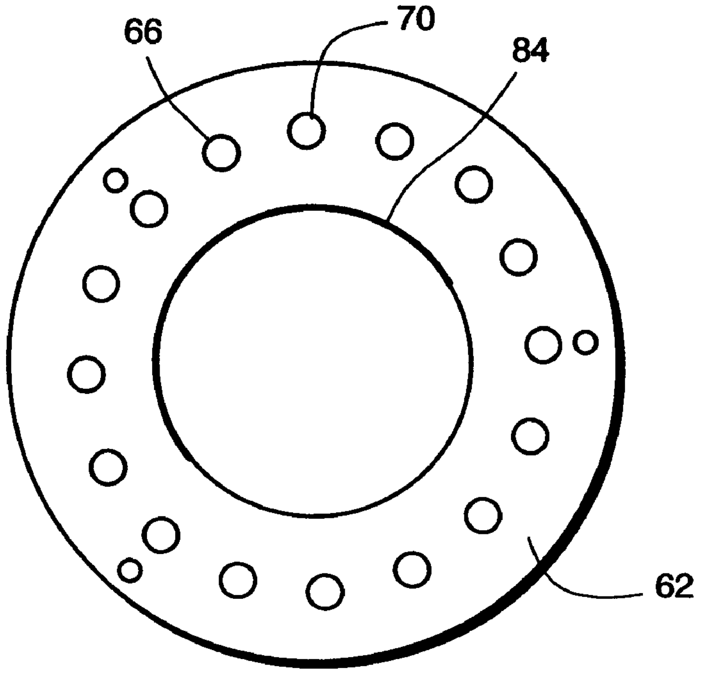
FIG. 18*c* is an end view of a second side of an overflow plate of FIG. 18*a*.

FIGS. 18A, 18B and 18C illustrate another embodiment of an overflow plate constructed and arranged to be used without a backing plate. Overflow plate 136 comprises a body 60 having a first surface 62, a second surface 64 and a plurality of underflow passageways 66 extending through the body 60 from the first surface 62 to the second surface 64. Underflow passageways 66 may be constructed and arranged to receive the underflow end 16 of hydrocyclone liner 12. Overflow plate 136 may also comprise a recess 68 in the second surface 64 constructed and arranged to collect overflow effluent from the overflow end 14 of hydrocyclone liner 12. Recess 68 may also be constructed and arranged to receive an overflow exit of hydrocyclone liner 12. Recess 68 may have any shape and depth suitable for a particular purpose.

The hydrocyclone bundle of FIG. 14 may be used in parallel or in series with other hydrocyclone bundles. Endcap 130 allows the underflow effluent to be redirected to on side of the hydrocyclone bundle. By removing endcap 130, a plurality of hydrocyclone bundles may be fluidly connected in series, such that the underflow effluent may be directed from a final hydrocyclone bundle in the series having a cap. The underflow effluent then passes through conduits 88 of each hydrocyclone bundle fluidly connected to each other.

It is to be appreciated that a wide variety of individual plate configurations and plate assemblies may be designed for a particular purpose. For example, as shown in FIGS. 18A-18C, an overflow plate and an underflow plate may be combined into one plate.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising," "including," "carrying," "having," "containing," "involving," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A hydrocyclone bundle comprising:

a plurality of hydrocyclone liners each having an overflow end and an underflow end;

a first plate fluidly connected to the overflow ends of the plurality of hydrocyclone liners, the first plate constructed and arranged to collect fluid from the overflow ends of the plurality of hydrocyclone liners; and a second plate fluidly connected to the underflow ends of the plurality of hydrocyclone liners, the second plate constructed and arranged to collect fluid from the underflow ends of the plurality of hydrocyclone liners, wherein the first and second plates are positioned adjacent one another.

2. The hydrocyclone bundle of claim 1, wherein the underflow end of a first hydrocyclone liner is positioned adjacent the underflow end of a second hydrocyclone liner.

3. The hydrocyclone bundle of claim 1, wherein the underflow end of a first hydrocyclone liner is positioned adjacent an overflow end of a second hydrocyclone liner.

4. The hydrocyclone bundle of claim 3, wherein the first plate has a recess in a second surface and the second plate has a recess in a first surface.

5. The hydrocyclone bundle of claim 4, wherein a first surface of the first plate is positioned adjacent a second surface of the second plate.

6. The hydrocyclone bundle of claim 5, further comprising a third plate constructed and arranged to form a collection space when positioned adjacent the second surface of the first plate.

7. The hydrocyclone bundle of claim 6, further comprising a fourth plate constructed and arranged to form a collection space when positioned adjacent the first surface of the second plate.

8. The hydrocyclone bundle of claim 7, wherein the fourth plate is a cap.

9. The hydrocyclone bundle of claim 6, wherein the first plate comprises:

a body; and at least one passageway extending from the recess on the second surface of the first plate through the body to the first surface.

10. The hydrocyclone bundle of claim 9, wherein the second plate comprises:

a body; and at least one passageway extending from the recess on the first surface of the second plate through the body to the second surface.

11. The hydrocyclone bundle of claim 5, wherein the first plate includes a recess in the second surface and the second plate has a protruded periphery portion extending outward from the first surface.

12. A hydrocyclone bundle, comprising:

a plurality of hydrocyclone liners, each having an overflow end and an underflow end;

a first end plate assembly comprising an overflow plate and an underflow plate;

a second end plate assembly comprising an overflow plate and an underflow plate;

wherein the overflow plate of the first end plate assembly is in fluid communication with the overflow plate of the second end plate assembly.

13. The hydrocyclone bundle of claim 12, wherein the underflow plate of the first end plate assembly is in fluid communication with the underflow plate of the second end plate assembly.

14. The hydrocyclone bundle of claim 12, wherein the underflow plate of the first end plate assembly comprises;

a body having a first surface and a second surface;

a recess in the second surface; and at least one passageway extending from the recess through the body to the first surface.

15. The hydrocyclone bundle of claim 14, wherein the overflow plate of the first end plate assembly comprises:

a body having a first surface and a second surface;

a recess in the first surface; and at least one passageway extending from the recess through the body to the second surface.

16. The hydrocyclone bundle of claim 15, wherein the first surface of the overflow plate is positioned adjacent the second surface of the underflow plate.

* * * * *